3,066,135
PROCESS FOR THE PREPARATION OF HEXOSE ALKALI METAL SALTS OF HEXOSE DIPHOSPHATE FROM INSOLUBLE SALTS THEREOF
Gianfranco Baruchello, Rome, Italy, assignor to Biomedica Int., Rome, Italy, a company of Italy
No Drawing. Filed June 13, 1960, Ser. No. 35,432
Claims priority, application Italy Oct. 3, 1959
5 Claims. (Cl. 260—234)

The present invention is concerned with a process for the preparation of valuable alkali metal salts of hexose diphosphate (fructose-1,6-diphosphate), starting from insoluble salts thereof.

Prior to the present invention, workers carrying out biological research with hexose diphosphate have had the same available primarily only in the form of alkaline earth metal salts or of salts of heavy metals. In the rare occasions when soluble alkali metal salts have been used, these have been directly obtained in water solution rather than in the isolated solid state, and recourse has been had to lyophilization of said solutions when it was necessary to preserve the alkali metal salt for any length of time. In fact, the alkali metal salts of the hexose diphosphate, if kept in solution, are extremely labile.

In view of the demonstrated valuable therapeutic properties of the alkali metal salts of the hexose diphosphate, a primary object of the present invention has been the embodiment of a process, capable of being carried out on an industrial scale, for the preparation of the said salts in dry, sterile and stable form, without having recourse to lyophilizing apparatus. A further object is the embodiment of such a process whereby the purity, sterility and apyrogenicity of the obtained products is such as to enable them to be employed therapeutically, and even to be administered intravenously.

These objects are realized by the present invention according to which, briefly stated, the free hexose diphosphoric acid is first prepared from an insoluble salt thereof by ion exchange, after which conversion into the desired soluble alkali metal salt form is achieved with the aid of alkali metal ions in an anhydrous organic ambient.

According to one presently preferred embodiment of the process of the invention, an insoluble alkaline earth metal salt of the hexose diphosphate is suspended in water and brought into solution by the addition of a readily volatile organic acid. The resultant solution is then passed through a column of cation exchange resin in order to obtain the free acid corresponding to the starting hexose diphosphate. The so-obtained solution, containing hexose diphosphoric acid and the volatile organic acid previously added as solubilizing agent, is concentrated under reduced pressure up to total elimination of water and the said volatile acid.

The residue of the concentration is dissolved in an anhydrous organic solvent and is then converted into the desired alkali metal salt of the hexose diphosphoric acid by the addition, with stirring, of a solution of the alkali metal in the same organic solvent.

The alkali metal salt of hexose diphosphoric acid (alkali metal hexose diphosphate), being insoluble in an anhydrous organic solvent, is filtered off, washed with anhydrous organic solvent and dried under sterile conditions. The product is perfectly stable provided it is kept in an anhydrous ambient, e.g. dry air.

According to an alternative presently preferred mode of procedure, the alkaline earth metal salt of the hexose diphosphoric acid, suspended in water, is directly treated with a cation exchange resin in order to remove the alkaline earth metal ion and to obtain the free hexose diphosphoric acid. This mode of procedure dispenses with the solubilization of the starting insoluble salt by means of a volatile organic acid.

Illustrative of the alkaline earth metal salts of the hexose diphosphoric acid are the calcium and barium salts.

The particular cation exchange resin employed to remove the alkaline earth metal ion is not of the essence of the invention, and use may be made for this purpose of any of the known cation exchange resins which, by virtue of the presence therein of the groups —$SO_3H$, —$CH_2COOH$ or —COOH, can react with cations, such as Ca and the like, of salts.

As the exchange material it is preferable to use a resin cation exchange material of the acid regenerated type. Such cation exchange resins are available as commercial products. The exchange resins may be obtained by condensing aldehydes such as formaldehyde with phenols or with phenol-sulfonic acids or with phenol-carboxylic acids or the like. Other exchange materials which may be used are sulfuric acid treated coal or wood or waste petroleum sludge or lignite or the like. Also the sulfonated polystyrene type cation exchange resins may be used. These exchange materials are treated with an acid such as sulfuric acid or the like to put them in the hydrogen cycle for use in removing cations or, in this particular case, calcium or barium ions.

The following examples, wherein the parts are by weight, represent presently preferred embodiments of the invention. In these examples, the well known Amberlite IR–120 cation exchange resin is used; this resin is a sulfonated polystyrene resin and is of the general type described in the D'Alelio Patent No. 2,366,007.

*Example 1*

1000 parts of insoluble calcium hexose diphosphate (also known as the calcium salt of fructose-1,6-diphosphate; $Ca_2C_6H_{10}O_{12}P_2$) are suspended in 700 parts of water and completely solubilized by the slow addition of dilute acetic acid.

The resultant clear solution is slowly passed through a column of sulfonated polystyrene cation exchange resin (Amberlite IR–120) in order to withdraw all the calcium.

The acid effluent solution is concentrated under reduced pressure (e.g. 25 mm. Hg) and at low temperature (e.g. 30° C.) until all the water and acetic acid present are eliminated.

The resultant distillation residue is dissolved in about 400 parts of anhydrous ethanol and precipitated with about 6 parts of sodium metal previously dissolved in 150 parts of anhydrous ethanol.

The obtained precipitate is then filtered and dried under sterile conditions.

The yield is 25–30 parts of water-soluble sodium salt of the hexose diphosphoric acid (sodium hexose diphosphate).

The anhydrous ethanol can, with equal results, be replaced by a corresponding quantity of another lower alkanol, such as methanol, butanol, propanol, isopropanol, etc.

The concentration of the aforementioned acid effluent solution may be carried out at any other desired pressure lower than 30 mm. Hg and at any other temperature not higher than 40° C.

*Example 2*

100 parts of the insoluble calcium salt of hexose diphosphoric acid (calcium hexose diphosphate) are suspended in 700 parts of water and stirred with about 600 parts of moist sulfonated polystyrene cation exchange resin (Amberlite IR–120). In this way, a water solution is directly obtained of hexose diphosphoric acid free from calcium, which solution is subsequently concentrated and treated as in Example 1, in order to obtain the sodium hexose diphosphate.

Potassium hexose diphosphate can be analogously prepared.

The alkali metal hexose-1,6-diphosphates obtained by the process according to the present invention can be used for the determination of the aldolase of the blood, since that enzyme catalyzes the resolution of fructose-1,6-diphosphate into 3-phosphoglyceraldehyde and di-hydroxyacetonephosphate: from the quantitative determination of the trioses it is possible to determine the amount of the aldolase present.

Having thus disclosed the invention, what is claimed is:

1. Process for making alkali metal salt of hexose diphosphoric acid from water-insoluble alkaline earth metal salt of hexose diphosphoric acid, comprising
   (1) contacting said water-insoluble alkaline earth metal salt with water and cation exchange resin, whereby alkaline earth metal ions are removed from the admixture by ion exchange with said resin,
   (2) volatilizing substantially all water from the resultant mixture, thereby leaving residue of hexose diphosphoric acid, and
   (3) reacting the resultant residue with alkali metal ions in anhydrous organic solvent.

2. Process of claim 1 wherein the anhydrous organic solvent is lower alkanol.

3. Process for making alkali metal salt of hexose diphosphoric acid from water-insoluble alkaline earth metal salt of hexose diphosphoric acid, comprising
   (1) dissolving the alkaline earth metal salt in a mixture of water and volatile organic acid,
   (2) contacting the resultant solution with cation exchange resin, whereby alkaline earth metal ions are removed from the solution, by ion exchange with said resin,
   (3) volatilizing substantially all water and volatile organic acid from the resultant solution, thereby leaving residue of hexose diphosphoric acid, and
   (4) reacting the resultant residue with alkali metal ions in anhydrous organic solvent.

4. Process of claim 3 wherein the volatile organic acid is acetic acid.

5. Process of claim 3 wherein the anhydrous organic solvent is lower alkanol.

References Cited in the file of this patent

UNITED STATES PATENTS

| 2,024,036 | Funaoka | Dec. 10, 1935 |
| 2,635,061 | McBurney | Apr. 14, 1953 |
| 2,694,057 | Adams | Nov. 9, 1954 |

OTHER REFERENCES

Neuberg et al.: "Archives of Biochemistry," vol. 3, No. 1, October 1943, pp. 33–44.

Wadman: J.A.C.S., August 1952, pp. 3051–3055.